(12) United States Patent
Pierini et al.

(10) Patent No.: US 7,361,720 B2
(45) Date of Patent: *Apr. 22, 2008

(54) HIGHLY CRYSTALLINE POLYPROPYLENE WITH LOW XYLENE SOLUBLES

(75) Inventors: Peter E. Pierini, Lake Jackson, TX (US); Marie L. Hare, Lake Jackson, TX (US); Clive P. Bosnyak, Missouri City, TX (US)

(73) Assignee: Dow Global Technologies Inc., Midland, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 10/530,462

(22) PCT Filed: Oct. 7, 2003

(86) PCT No.: PCT/US03/31567

§ 371 (c)(1),
(2), (4) Date: Apr. 5, 2005

(87) PCT Pub. No.: WO2004/033509

PCT Pub. Date: Apr. 22, 2004

(65) Prior Publication Data

US 2005/0272858 A1    Dec. 8, 2005

Related U.S. Application Data

(60) Provisional application No. 60/491,586, filed on Jul. 31, 2003, provisional application No. 60/416,632, filed on Oct. 7, 2002.

(51) Int. Cl.
C08F 110/06 (2006.01)
C08L 23/12 (2006.01)

(52) U.S. Cl. .............. 526/351; 525/240; 525/333.7; 524/80

(58) Field of Classification Search ............ 526/351; 525/240, 333.7; 524/80
See application file for complete search history.

(56) References Cited

U.S. PATENT DOCUMENTS 5,948,839 A * 9/1999 Chatterjee ............... 524/108
6,231,936 B1 5/2001 Kozimor et al.
6,358,450 B1 * 3/2002 Sun ....................... 264/178 R
6,472,473 B1 10/2002 Ansems et al.
6,639,038 B2 * 10/2003 Kuramoto et al. .......... 526/351
6,815,490 B2 11/2004 Seelert et al.
2004/0171782 A1 * 9/2004 Lin et al. ................. 526/351

FOREIGN PATENT DOCUMENTS

| DE | 197 27 065.4 |   | 1/1998 |
| EP | 0651014 A1 |   | 5/1995 |
| EP | 0659830 A1 |   | 6/1995 |
| EP | 757069 | * | 2/1997 |
| EP | 0757069 A |   | 2/1997 |
| EP | 903356 | * | 3/1999 |
| WO | WO-9733941 A |   | 9/1997 |
| WO | WO-9920663 A |   | 4/1999 |
| WO | WO-9924479 A1 |   | 5/1999 |
| WO | WO-0008078 A1 |   | 2/2000 |
| WO | WO-01/403174 |   | 6/2001 |
| WO | WO-03037981 A1 |   | 5/2003 |

OTHER PUBLICATIONS

E.P. Moore, "Polypropylene Handbook", 1996, p. 243, Hanser/Gardner Publications, Cincinnnati.
B. Wunderlich, Macromolecular Physics, 1960, p. 48, vol. 3, Crystal Melting, Academic Press, New York.
TH.G. Scholte, N.J.L. Meijerink, H.M. Schoffeleers, and A.M.G. Brands, J. Appl. Polm. Science, 1984, pp. 3763-3782, vol. 29.
E.P. Otocka, R.J. Roe, N.Y. Hellman, P.M. Muglia, Macromolecules, 1971, p. 507, vol. 4.
V. Busico, R. Cipullo, G. Monaco, M. Vacatello, A.L. Segre, Macromolecules, 1997, pp. 6251-6263, vol. 30.
Edward P. Moore, Jr.,"Specialty Types and Developments," *Polypropylene Handbook: Polymerization, Characterization, Properties, Processing, Applications*, 403-406, Cincinnati: Hanser/Gardner Publications, Inc. (1996).

* cited by examiner

Primary Examiner—Roberto Rabago

(57) ABSTRACT

The invention is directed to a polypropylene resin which has a $M_w/M_n$ of less than 5, a melt flow rate of less than 7 g/10 min., a 1% secant flexural modulus of greater 5 than 300,000 psi and less than 2 wt. % xylene solubles.

7 Claims, 1 Drawing Sheet

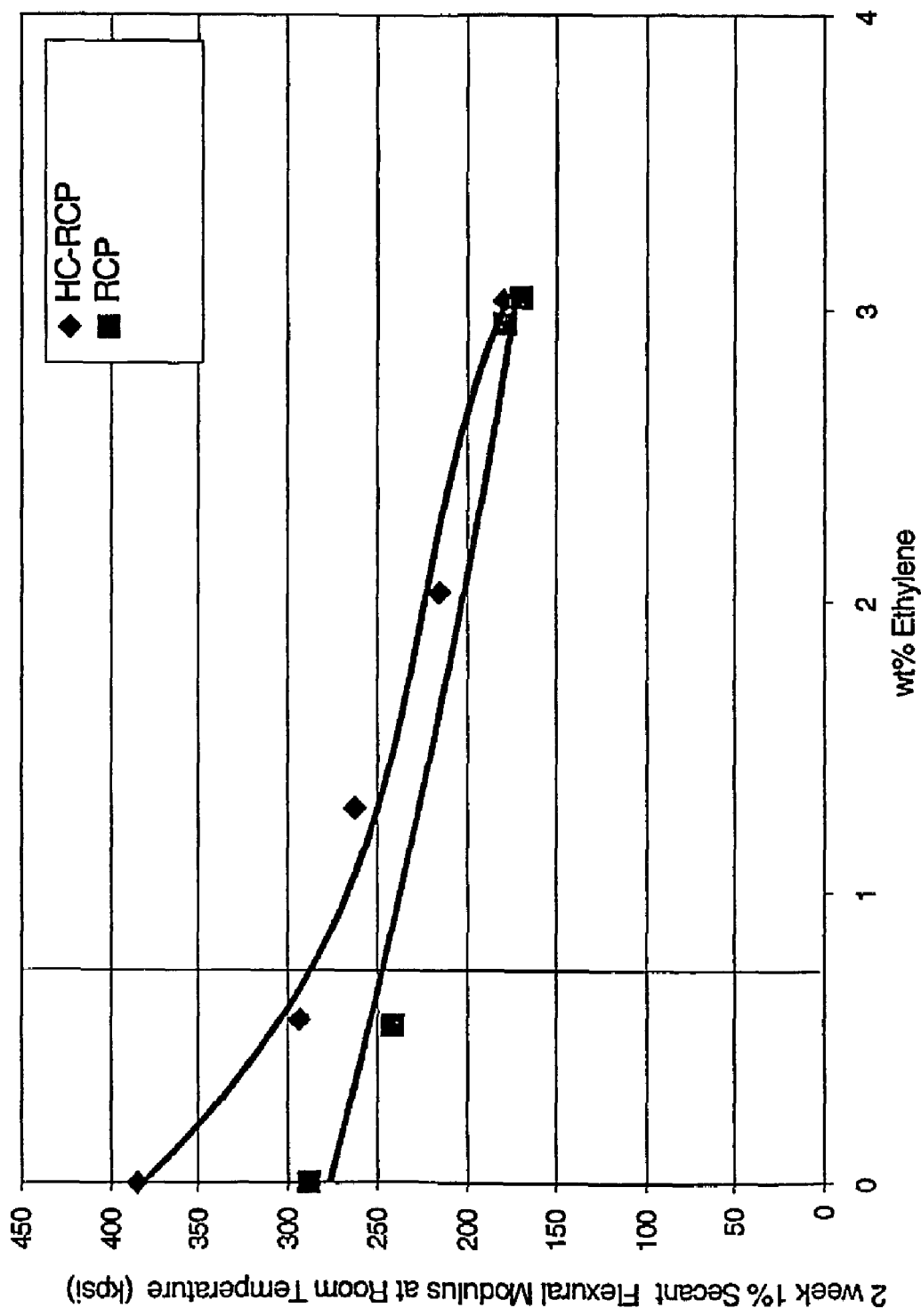
Figure

HIGHLY CRYSTALLINE POLYPROPYLENE WITH LOW XYLENE SOLUBLES

"This application claims the benefit of U.S. Provisional Application Nos. 60/416,632, filed Oct. 7, 2002, and 60/491,586, filed Jul. 31, 2003, which are both hereby incorporated by reference herein in their entirety."

FIELD OF THE INVENTION

This invention relates to highly crystalline propylene polymers having a relatively narrow molecular weight distribution (Mw/Mn), a relatively high flexural modulus, and preferably a relatively low melt flow rate. More particularly, this invention is directed to a propylene homopolymer which has a low amount of xylene solubles, but also has a narrow molecular weight distribution, retains a high flexural modulus and a low melt flow. The invention also relates to a blend of the above-described highly crystalline propylene homopolymer with an ethylene-alpha olefin copolymer. Preferably, the copolymer is comprised of units derived from ethylene and a $C_4$-$C_8$ alpha olefin.

BACKGROUND OF THE INVENTION

Broad molecular weight distributions have been thought to be necessary to achieve a high flexural modulus to achieve stiffness. Broad molecular weight distributions, however, are associated with polymers having high molecular weight fractions and low molecular weight fractions. The high molecular weight fraction (sometimes referred to as a high molecular weight tail) can lead to increased die swell while processing the polymer. This die swell will be especially pronounced for processes that utilize low melt flow rate (MFR) polymers, especially fractional melt flow rate polymers. The low molecular weight fraction (sometimes referred to as a low molecular weight tail) can lead to high xylene solubles. Also, the low molecular weight fractions can cause processing problems, such as die drip and smoking during polymer processing, as well as environmental problems in the form of volatile organic emissions. Smoking is of particular concern with processes which utilize very high melt flow rate polymers, such as fiber spinning and nonwoven fabrics production. Increasing melt flow rate has been associated with decreasing molecular weight which decreasing molecular weight would be expected to lower impact strength.

Additionally, lower molecular weight distribution has typically been associated with polypropylenes having lower stiffness, as measured by flexural modulus (see, for example, "Polypropylene Handbook", E. P. Moore, pg. 243, Hanser/Gardner Publications, Cincinnati (1996)). What is desired is a polypropylene that exhibits a relatively narrow molecular weight distribution, but also exhibits high flexural modulus and low xylene solubles.

OBJECT OF THE INVENTION

An object of the invention is to provide a highly crystalline polypropylene homopolymer having a narrow molecular weight distribution, low melt flow rate and high flexural modulus.

Another object of the invention is to provide a crystalline polypropylene having a flexural modulus and molecular weight distribution which are relatively insensitive to molecular weight changes, but which also have low xylene solubles.

Still another object of the invention is to provide a polypropylene homopolymer that provides the above properties and also exhibits excellent optical properties, such as improved contact clarity and lower values for haze than comparable commercially available polypropylene homopolymers.

Another object of the invention is to provide for a highly crystalline polypropylene that is a homopolymer or copolymer having less than 3 percent (preferably less than 2 percent) by weight of units derived from ethylene and exhibits high flexural modulus, relatively narrow molecular weight distribution and excellent optical properties relative to comparative commercially available polypropylene resin.

A further object of the invention is to provide an impact modified polypropylene copolymer wherein the homopolymer (and/or copolymer) matrix has the above delineated properties and the impact modified polypropylene copolymer exhibits an excellent balance of stiffness (as measured, for example, by flexural modulus and/or tensile strength) and toughness (as measured, for example, by notched Izod impact tests) and further exhibits excellent optical properties relative to comparable impact modified polypropylene copolymers having similar stiffness and toughness.

Another further object of the invention is to provide a blend of high crystalline polypropylene and high melt strength polypropylene that provides for articles having an excellent balance of toughness (including low temperature impact resistance), melt strength, stiffness and clarity. In particular it is an object of the invention to provide a blend having the above listed properties together with an improved ability to be thermoformed under a wide variety of processing conditions.

These and other objects of the invention will become apparent with reference to the specification.

SUMMARY OF THE INVENTION

In one aspect, the invention is a polypropylene resin which has a low melt flow rate, a narrow molecular weight distribution ($M_w/M_n$) and low xylene solubles. Heretofore, it has been thought that broad molecular weight distributions were necessary to attain high stiffness and modulus. Broad molecular weight distributions, however, can result in unacceptably high xylene solubles, especially for polymers having higher melt flow rates, because of low molecular weight polymer fractions present in the resin. These solubles result in processing and environmental problems which have to be addressed. Additionally, broad molecular weight distributions result in an unacceptable high percentage of high molecular fraction material for lower melt flow rate polymers. As discussed earlier, these high molecular weight fractions result in increased die swell and other processing problems for lower melt flow rate polypropylene polymers.

In this aspect, the polypropylene resin of the invention provides a highly crystalline resin having a crystallinity of greater than 70% (preferably greater than 73%, more preferably greater than 75%), a low melt flow rate (MFR) of less than 7 g/10 minutes at 230° C./2.16 kg, a $M_w/M_n$ of less than 5, a 1% secant modulus of greater than 300,000 p.s.i. and xylene solubles of less than 2 percent by weight (wt %), preferably less than 1 wt %. Preferably, the polypropylene resin is nucleated/clarified with a nucleator/clarifier additive, and has a haze of less than 30% (more preferably less than 25%, most preferably less than 20%), a crystallization temperature of greater than 130° C., preferably greater than 133° C. In an important aspect, the polypropylene resin of the invention has a melt flow rate at 230° C. of less than 5 g/10 min, an isotactic pentad/triad ratio of preferably greater than 95%, more preferably greater than 96%, further more preferably greater than 98%, most preferably greater than 99%, and a pentad isotacticity of preferably at least 96%, more preferably at least 97%, most preferably at least 98%.

In a second aspect, the polypropylene resin is defined by the following equation:

$$FM/((XS-0.74\% \ E)*MWD) \geq 30{,}000 \text{ p.s.i.} \qquad (1)$$

wherein $XS \leq 2$ wt %+% E; and
$MWD \leq 6$; and

Where FM is the 1% secant flexural modulus measured in accordance with procedure ASTM D790-00, XS is weight percent of the xylene soluble content of the resin measured in accordance with the procedure described below, and MWD is defined as Mw/Mn. % E is the weight percent of units derived from ethylene in the polypropylene. Preferably, the MWD of the polypropylene homopolymer is less than 5.5, more preferably less than 5. Preferably the $XS \leq 2$ wt %+% E/2. In this aspect, the polypropylene resins preferably are nucleated/clarified with a nucleator/clarifier additive.

In one embodiment of this second aspect, the polypropylene resin is a homopolymer. In this embodiment, the haze values exhibited by the nucleated/clarified resins are preferably less than 30%, more preferably less than 25%, most preferably less than 20% as measured in accordance with procedure ASTM D1003. The isotactic pentad/triad ratio is preferably at least 95%, more preferably at least 98%, most preferably at least 99%. Additionally, the crystallinity of the inventive resins is preferably at least 70%, more preferably at least 73%, most preferably at least 75%, as measured in accordance with the description described below. Further, the inventive polypropylene has crystallization temperature of greater than 130° C., preferably greater than 133° C.

In another embodiment of this second aspect, the polypropylene resin is a propylene-based copolymer having 3% or less by weight units derived from ethylene, preferably 2% or less by weight, more preferably 1% or less by weight units derived from ethylene; and where modulus is especially important, preferably from 0.2% by weight to 0.8% by weight units derived from ethylene. Preferably, the haze exhibited by these resins is 25% or less, more preferably 20% or less, and for copolymers with 2 to 3% by weight units derived from ethylene, preferably haze values of 15% or less. Preferably, the resins exhibit Pentad/triad ratios of at least 98.0%, preferably at least 98.5% and in some instance pentad to triad ratios of at least 99.0%. Furthermore, the crystallinity exhibited by these copolymer resins as measured by DSC (as described below) is preferably at least 55%, more preferably at least 60%, further more preferably at least 65%. In this embodiment the pentad isotacticity is at least 90%, preferably at least 92%, more preferably at least 94%, most preferably at least 95%, and in some instances at least 96%. Preferably, in this embodiment the XS content is preferably less than 4 percent by weight, more preferably less than 3 percent by weight, further more preferably less than 2 percent by weight of the polypropylene resin. Additionally, for the inventive polymers, it has been unexpectedly discovered that the polymers have a comparable or lower melting point (as determined by DSC) together with higher crystallinity for a given weight percent of units derived from ethylene. This characteristic of the resins will lead to more efficient and facile melt processing than conventional Ziegler-Natta propylene-based copolymers. Furthermore, in this embodiment of the second aspect, the inventive polymers exhibit a relationship where the value obtained from equation (1) is preferably greater than 40,000 p.s.i.

In a third aspect, the invention is an impact modified polypropylene copolymer composition comprised of a first polymer component comprising a high crystalline homopolymer or copolymer resin in accordance with the first and/or second aspect of this invention. This high crystalline resin is blended with an impact modifier. The impact modifier improves the toughness and impact strength of the composition. The impact modifier preferably is a polyolefin rubber, which exhibits a glass transition temperature of less than −20° C. The impact modifier preferably makes up no greater than 40% by weight of the composition.

The impact modifiers include ethylene/alpha-olefin copolymers and terpolymers and block copolymers, ethylene-propylene diene rubbers, propylene-alpha olefin copolymers, silicon rubbers, butadiene-based rubber and the like. The more preferred impact modifiers are ethylene/alpha-olefin copolymers made with single-site or metallocene catalysts wherein the units within the impact modifier derived from ethylene are greater than 50% by weight and the alpha-olefin is selected from olefins having at least three carbon atoms, preferably at least 4 carbon atoms, more preferably from 4 to 12 carbon atoms, further more preferably from 4 to 8 carbon atoms. The even more preferred alpha-olefins are 1-butene, 1-hexene, 1-heptene, and 1-octene. The most preferred alpha-olefin is 1-octene.

The impact modifiers preferably have a density of from 0.854 to 0.91 g/ml. For ease of handling, the impact modifier preferably has a density greater than 0.865 g/ml. In applications requiring greater impact, the impact modifier preferably has a density of from about 0.865 g/ml to 0.88 g/ml. For applications requiring enhanced clarity, the impact modifier preferably has a density of from 0.885 g/ml to 0.91 g/ml. Where clarity is critical, preferably the density of the impact modifier is matched to the density of the high crystalline polypropylene homopolymer or copolymer. In order to be matched, the density of the impact modifier is preferably within 0.03 g/ml of the density of the high crystalline polypropylene, more preferably within 0.02 g/ml, most preferably within 0.01 g/ml of the density of the high crystalline polypropylene used.

In a further aspect, a high crystalline polypropylene resin, as described above is blended with a high melt strength polypropylene (as described below) to provide a blend having an excellent balance of low temperature impact resistance, improved melt strength (relative to comparable blends not containing a high melt strength polypropylene), stiffness, and optical properties, such as clarity.

BRIEF DESCRIPTION OF THE FIGURE

The FIGURE is a graph showing the 1% secant flexural modulus exhibited by the inventive high crystalline propylene-ethylene copolymers (HC-RCP) versus the flexural modulus for comparative conventional Ziegler-Natta propylene-ethylene copolymers (RCP). The FIGURE shows that for ethylene levels of 3% or less, the inventive copolymers are stiffer than conventional propylene-ethylene copolymers. The data for FIG. 1 come from the resins of Examples 2, and 7-10 and Comparative 7, 10a, and 10b that were tested in accordance with ASTM D790-00, except that they were aged for two weeks.

DETAILED DESCRIPTION OF THE INVENTION

Degree of crystallinity is measured by differential scanning calorimetry (DSC) using a Q1000 TA Instrument. In this measurement a small ten milligram sample of the propylene polymer is sealed into an aluminum DSC pan. The sample is placed into a DSC cell with a 25 centimeter per minute nitrogen purge and cooled to about minus 100° C. A standard thermal history is established for the sample by heating it at 10° C. per minute to 225° C. The sample is kept at 225° C. for 3 minutes to ensure complete melting. The sample then is cooled at 10° C. per minute to about −100° C. The sample is again kept isothermal at −100° C. for 3 minutes to stabilize. It is then reheated at 10° C. per minute to 225° C. The observed heat of fusion ($\Delta H_{observed}$) for the second scan over a range of 80-180° C. is recorded. The observed heat of fusion is related to the degree of crystallinity in weight percent based on the weight of the polypropylene sample by the following equation:

$$\text{Crystallinity \%} = (\Delta H_{observed})/(\Delta H_{isotactic\ pp}) \times 100 \quad (2)$$

where the heat of fusion for isotactic polypropylene ($\Delta H_{isotactic\ pp}$) is reported in B. Wunderlich, Macromolecular Physics, Volume 3, Crystal Melting, Academic Press, New York, 1960, p 48, is 165 Joules per gram (J/g) of polymer. The peak temperature of crystallization from the melt is determined by the DSC as above with a cooling rate of 10° C./min. The melting temperature is determined by the peak of the melting transition.

Molecular weight distribution (MWD) for the polypropylene homopolymers is determined by gel permeation chromatography (GPC) as follows:

The polymers are analyzed by gel permeation chromatography (GPC) on a Polymer Laboratories PL-GPC-220 high temperature chromatographic unit equipped with four linear mixed bed columns, 300×7.5 mm (Polymer Laboratories PLgel Mixed A (20-micron particle size)). The oven temperature is at 160° C. with the autosampler hot zone at 160° C. and the warm zone at 145° C. The solvent is 1,2,4-trichlorobenzene containing 200 ppm 2,6-di-t-butyl-4-methylphenol. The flow rate is 1.0 milliliter/minute and the injection size is 100 microliters. A 0.2% by weight solution of the sample is prepared for injection by dissolving the sample in nitrogen purged 1,2,4-trichlorobenzene containing 200 ppm 2,6-di-t-butyl-4-methylphenol for 2.5 hrs at 160° C. with gentle mixing The molecular weight determination is deduced by using ten narrow molecular weight distribution polystyrene standards (from Polymer Laboratories, EasiCal PS1 ranging from 580-7,500,000 g/mole) in conjunction with their elution volumes. The equivalent polypropylene molecular weights are determined by using appropriate Mark-Houwink coefficients for polypropylene (as described by Th. G. Scholte, N. L. J. Meijerink, H. M. Schoffeleers, and A. M. G. Brands, J. Appl. Polym. Sci., 29, 3763-3782 (1984), incorporated herein by reference) and polystyrene (as described by E. P. Otocka, R. J. Roe, N. Y. Hellman, P. M. Muglia, Macromolecules, 4, 507 (1971) incorporated herein by reference) in the Mark-Houwink equation:

$$\{\eta\} = KM^a$$

where $K_{pp}$=1.90E-04, $a_{pp}$=0.725 and $K_{ps}$=1.26E-04, $a_{ps}$=0.702.

Unless otherwise indicated, for the propylene-based resins listed herein, 1% Secant flexural modulus is determined by ASTM D790-00.

Melt flow rate is measured in accordance with ASTM D 1238-01 test method at 230° C. with a 2.16 kg weight for the propylene-based polymers. Melt index for the ethylene-based polymers is measured in accordance with ASTM D 1238-01 test method at 190° C. with a 2.16 kg weight.

Xylene solubles are determined by dissolving 4±0.1000 g. of sample into a 250 ml Erlenmeyer flask and adding by means of a pipette 200 ml of inhibited xylene. To inhibit xylene, add 18.35 g of Irganox 1010 to 200 mls. of xylene in a beaker and stir until dissolved. After the Irganox 1010 is dissolved, pour the solution into a 4.9 gallons of xylene and thoroughly mix the solution. Introduce a stirring bar, place a water-cooled condenser on the flask and position the flask assembly on a magnetic stirrer/hot plate. Stir vigorously and adjust heating to obtain gentle boiling until the sample is completely dissolved. A nitrogen blanket should be maintained on the condenser during the procedure. After the sample is dissolved, remove the flask assembly from the magnetic stirrer/hot plate, remove the stirring bar, then cover. Let the flask cool to near room temperature (30° C., cooling takes approximately 1 hour). Place a lead ring on the flask and immerse in constant temperature water bath. After temperature inside flask reaches 25±0.5° C., let stand in water 30 more minutes. During the cooling, the insoluble portion precipitates. The solution is filtered; then a 100 ml aliquot of the filtrate is placed in an aluminum pan and evaporated to dryness under a nitrogen stream. The solubles present are determined by weighing the residual polymer.

Isotactic pentad percent, Isotactic triad percent and the Isotactic pentad/triad ratio are determined by one of ordinary skill in the art according to the following: $^{13}$C nuclear magnetic resonance (NMR) provides a direct measure of the tacticity of poly(propylene) homopolymers. The analysis used here neglects chain ends and inverse insertions.

The FIGURE below shows the typical polypropylene triads and their associated $^{13}$C chemical shifts. For the triad names (mm, mr, and rr) 'm' stands for meso, and 'r' stands for racemic. The isotactic triad percent is a measure of the mm triads.

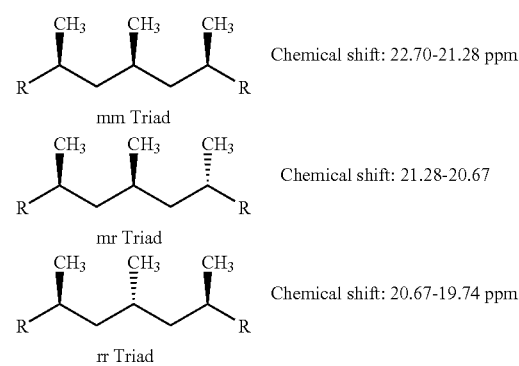

The isotactic pentad percent is a measure of the mmmm pentads The chemical shift for mmmm pentads is 22.0-21.7 ppm.

V. Busico, R. Cipullo, G. Monaco, M. Vacatello, A. L. Segre, Macromolecules 1997, 30, 6251-6263 describes methods for determining isotactic pentad and triads using NMR analysis.

The isotactic pentad/triad ratio is the ratio of the isotactic pentad percent to the isotactic triad percent. In determining the isotactic pentad and triad values, the samples are prepared by dissolving 0.5 g of the polypropylene homopolymer in a mixture of 1.75 g of tetrachloroethane-d2 (TCE-d2) and 1.75 g of 1,2-orthodichlorobenzene. Samples are homogenized in a heating block at 150° C. and heated with a heat gun to facilitate mixing. NMR experiments are performed on a Varian Unity+400 MHz, at 120° C., using a 1.32 sec acquisition time, 0.7 sec repetition delay, 4000 acquisitions and continuous proton decoupling (fm-fm modulation), with and without spinning the sample. Total scan time used is 2.25 hrs.

The reactor configuration to make the crystalline polypropylene is one which does not broaden the molecular weight distribution beyond the target value. Suitable reactors include a liquid pool reactor with a stirred tank, a gas phase fluidized bed reactor, a single continuous stirred tank reactor, and a single slurry loop reactor with high monomer feed to internal recirculation ratio. These types of reactors may be used in combination if the reactants are properly controlled to minimize broadening of the molecular weight distribution for the crystalline polypropylene produced, usually by maintaining constant hydrogen concentration from one reactor to the next.

The additive package which is used for the polypropylene includes the additives typically used for propylene polymers. Additionally, a nucleator/clarifier additive is preferably used to increase the flexural modulus of the resulting resin. This nucleator/clarifier is chosen to optimize the stiffness/toughness/clarity balance. Any additive, which simultaneously clarifies and nucleates can be used. Nucleator/clarifier additives such as ADK NA-11 and ADK NA-21 are commercially available from Asahi Denka Kokai and preferably are added to the crystalline polypropylene of the invention to improve the stiffness/toughness/clarity balance of the resins. Millad 3988 available from Milliken & Company is another example of a Nucleator/Clarifier. The Nucleator/Clarifier is preferably present within the polypropylene at levels of at least 500 ppm and less than 2500 ppm; more preferably the nucleator/clarifier is at levels of at least 650 ppm and less than 1500 ppm; most preferably the nucleator/clarifier is at levels of at least 750 ppm and less than 1250 ppm. In some applications where cystallinity is particularly important, the nucleator/clarifier is most preferably present at levels of up to 1500 ppm. Nucleator/Clarifiers are preferably added to the crystalline polypropylene of the invention to improve the stiffness/toughness/clarity balance of the resins.

A Ziegler-Natta catalyst (a ZN catalyst) combined with a suitable internal/external donor combination that will produce a polypropylene product with xylene extractables or solubles of less than of 2 wt %, as measured by the method described above, and a NMR pentad/triad ratio of preferably greater than 95%, more preferably greater than 98%, most preferably at least 99%.

The polypropylene resins and the impact modified polypropylene copolymers of the invention are useful for the fabrication of articles via (extrusion or injection) blow molding, injection molding, injection stretch blow molding, rotomolding, profile extrusion, sheet extrusion, pipe extrusion, thermoforming, blown and cast film forming, and foaming.

In particular, the polypropylene resins and the impact modified polypropylene copolymers are especially useful for making articles by processes that require relatively low melt flow rates, such as, BOPP film and blown film processes, blow molding and profile extrusion (such as pipe extrusion) processes, thermoforming and calendering processes, all of which take advantage of polymers having melt flow rates of 5 or below, preferably, 4 or below. Additionally, the superior stiffness of articles made from the homopolymer polypropylene and impact modified polypropylene copolymer resins of the invention will lead to enhanced processability, and will enable the articles to be downgauged in thickness, which will lead to reduced manufacturing cycle time and reduced costs. Further, the impact modified polypropylene copolymer resins of the invention will provide enhanced low temperature toughness to articles made with it. Further, the impact modified polypropylene copolymers of the invention will also exhibit excellent heat distortion characteristics, due to their high crystallization temperatures and high melting point temperatures.

Some examples of end-use application that the resins are suitable for include: deli containers, microwavable containers, frozen food containers, trays for holding food, dairy containers, meat and poultry containers and trays, lidstock, cups, bowls, and food containers, in general.

In a particular aspect, the high crystalline polypropylene is blended with a high melt strength polypropylene. The high melt strength polypropylene preferably is made through the use of a coupling agent as described in U.S. Pat. No. 6,472,473 B1 to Ansems et. al, issued Oct. 29, 2002, which is incorporated by reference herein in its entirety. Preferably, the coupling agent is a poly(sulfonyl azide) as described in U.S. Pat. No. 6,472,473 B1. In this aspect the high melt strength polypropylene may be homopolymer polypropylene, a propylene-based copolymer or an impact modified propylene-based copolymer blend. Preferably, the high melt strength polypropylene is a coupled impact propylene copolymer as described in U.S. Pat. No. 6,472,473 B1.

In this aspect, the weight ratio of high crystalline polypropylene to high melt strength polypropylene typically is from 95:1 to 1:95, preferably from 19:1 to 7:3. The blend of this aspect will provide excellent processing properties as compared with blends that don't contain a high melt strength polypropylene, including: broadened processing temperature window, reduced sag in articles during thermoforming applications, improved wall thickness uniformity in the final articles, and increased processing speeds during article formation. Further, as discussed earlier, the produced articles will also exhibit an excellent balance of toughness, stiffness and optical properties, such as contact clarity.

The end-use articles, which can take advantage of the blend of this aspect, are those described earlier. In particular, the blends of this aspect will be especially useful for thermoforming processes. For thermoforming, the melt flow rate of the blend is typically from 0.1 to 6 g/10 min, preferably from 0.5 to 4 g/10 min.

EXAMPLES

Example 1

A polypropylene homopolymer, Example 1, Tables 1 and 2, is produced in a single, continuous bulk phase (condensed propylene) stirred tank reactor. A Ziegler-Natta catalyst, which includes a titanium catalytic active metal species supported on a magnesium chloride support, which is commercially available as Toho Series C, Group JC and may be purchased from Toho Titanium Ltd., is suspended in Kaydol white mineral oil, purchased from Witco, at 38 wt. % and stored in a stirred catalyst feed tank. The suspended catalyst is pumped directly into a nominal 25,000 gallon continuous, stirred tank reactor which is filled to approximately ⅔ capacity with liquid propylene. The desired temperature of the reactor is 65-68° C. controlled by condensing propylene vapor in a separate set of heat exchangers and returning the liquid stream to the reactor along with the non-condensable fraction. An external alkoxysilane donor, which is commercially available from Degussa-Huels, [(CH$_2$)$_4$CH]$_2$Si(OMe)$_2$, is fed continuously to the reactor in the amount needed to reduce the xylene extractable fraction to less than 1%, measured as described above. For all the propylene resins listed herein the xylene solubles test described above was used to measure the xylene soluble fraction. The target concentration of the external donor in the liquid propylene, corrected for solids, is 150 ppm. Undiluted aluminum alkyl cocatalysts, (triethylaluminum, AlEt$_3$ commonly called TEAL) are added to the propylene feed stream to adjust the TEAL concentration in the liquid propylene to a control target of 150 ppm in the liquid propylene. A polypropylene polymerization is conducted with the reactor polymer solids at about 40-42 wt. %. A chain transfer agent, hydrogen, is continuously fed to the reactor, to produce a 1 g/10 min MFR propylene polymer, as measured by ASTM D 1238-01. The reactor discharge stream is degassed in a series of three vessels to separate the liquid propylene and process lights from the polypropylene powder product. The degassed powder then is forwarded to a ribbon blender/heater in 4000 lb. batches. A nucleator/clarifier additive or agent ADK NA-11, which is a complex organophosphate metal salt, is commercially available from Amfine Chemical Corp., the North American joint venture of Asahi Denka Kogyo K.K. and Mitsubishi Corp. Antioxidants Irgafos™ 168, Tris(2,4-di-t-butylphenyl) phosphite, and Irganox™ 1010, Tetrakismethylene(3,5-di-t-butyl-4-hydroxyhydrocinnamate) methane, is commercially available from CIBA Specialty Chemical. The ADK NA-11 at 1500 ppm, DHT-4A at 400 ppm, Irgafos 168 at 1000 ppm and Irganox 1010 at 1000 ppm are added to the ribbon blender and mixed. DHT-4A is a hydrotalcite-like compound, Mg$_{4.3}$Al$_2$(OH)$_{12.6}$CO$_3$-mH$_2$O, that has been developed as a stabilizer (halogen scavenger) for polyolefin and other plastics. DHT-4A is sold commercially by Kyowa Chemical Industry Co., Ltd. The polypropylene powder then is dumped into a surge vessel. The powder then is continuously fed to a set of single screw extruders for compounding and pelletization. This product homopolymer is produced and placed in a rail car hopper. In addition to the properties of Tables 1 and 2, the resin of Example 1 exhibited a 1% Secant Flexural Modulus of 374,000 p.s.i. after being aged for 2 weeks under the conditions set forth in ASTM D790-00. It can be seen from this Example and the following Examples, that the inventive propylene-based resins exhibited excellent flexural modulus properties equivalent to or better than the comparable conventional Ziegler-Natta polymers, while at the same time exhibiting better optical properties (such as haze) for a given modulus. It is significant that this excellent balance of stiffness and optical properties is achieved with a relatively low Mw/Mn (molecular weight distribution).

Example 2

A polypropylene homopolymer of Example 2, Tables 1 and 2, is produced in the same manner as Example 1, except that a chain transfer agent, hydrogen, is continuously fed to the reactor to produce a 4.5 g/10 min MFR polypropylene polymer. In addition to the properties of Tables 1 and 2, the resin of Example 2 exhibited a 1% Secant Flexural Modulus of 385,000 p.s.i. after being aged for 2 weeks under the conditions set forth in ASTM D790-00.

Example 3

A polypropylene homopolymer of Example 3, Tables 1 and 2, is produced in the same manner as Example 1, except that a chain transfer agent, hydrogen, is continuously fed to the reactor to produce a 20 g/10 min MFR polypropylene polymer. Trigonox™ 101, 2,5-Dimethyl-2,5 di(t-butylperoxy)-hexane (a polypropylene cracking agent), purchased from Akzo Nobel is added to the ribbon blender before pelletization. In addition to the properties of Tables 1 and 2, the resin of Example 3 exhibited a 1% Secant Flexural Modulus of 375,000 p.s.i. after being aged for 2 weeks under the conditions set forth in ASTM D790-00.

Example 4

A polypropylene homopolymer of Example 4, Tables 1 and 2, is produced in the same manner as Example 1, except that a chain transfer agent, hydrogen, is continuously fed to the reactor to produce a 2.1 g/10 min MFR impact modified polypropylene copolymer final product. The aim target MFR for the homopolymer is 1.6 g/10 min MFR. The MFR and other properties of this intermediate homopolymer were not measured, but the properties of the homopolymer are expected to be similar to the properties of the homopolymer of Example 1. The copolymer final product is made by introducing 18% by weight of a commercial rubber Affinity™ PL 1880, an ethylene/1-octene polyethylene copolymer having a melt index (I$_2$) of 0.75-1.25 g/10 min, a density of 0.8995-0.9045 g/ml, and an I$_{10}$/I$_2$ of 8.5-9.5 available from The Dow Chemical Company, along with the other named additives into the ribbon blender, and then mixed. The mixture of polypropylene powder and polyethylene pellets then is dumped into a surge vessel. The mixture then is continuously fed to a set of single screw extruders for compounding and pelletization. The impact modified polypropylene is produced and placed in a rail car hopper.

The impact modified polypropylene polymer had the following properties in addition to those listed in Tables 1 and 2:

Notched Izod, 73 deg. F., ft-lb/in: No Break
Gardner Impact Resistance, 73 deg. F., ft-in: 280
Distortion temperature under load, 66 psi, deg. F.: 235° F. (measured in accordance with ASTM D 648-98c).

This Example shows that through the use of a highly crystalline polypropylene homopolymer as a starting material, an impact modified polypropylene copolymer can be obtained that exhibits an excellent stiffness/toughness/clarity balance. Preferably, the impact modified copolymers have a 1% secant flexural modulus of at least 200,000 p.s.i., more preferably at least 220,000 p.s.i., further more preferably at least 235,000 p.s.i., most preferably at least 240,000 p.s.i., and in some instances, at least 250,000 p.s.i. Additionally, the impact modified polypropylene copolymers of the invention preferably exhibit "no break" IZOD levels at room temperature and at 0° C.; and preferably exhibit a ductile to brittle transition temperature (DBTT) of less than 10° C., more preferably less than 0° C., further more preferably less than –5° C., and in some instances less than –10° C., even more preferably less than –20° C. Further, the impact modified polypropylene copolymers preferably exhibit haze levels less than 30%, more preferably less than 25%, further more preferably less than 23%, and in some instances less than 21%.

Examples 5 and 6 show the properties of an inventive polypropylene homopolymer and impact modified polypropylene copolymer that contain 830 ppm of ADK NA-11. These examples show that very similar physical properties can be obtained while using a lower amount of nucleator/clarifier.

Example 5

A polypropylene homopolymer of Example 5, Tables 1 and 2, is produced in the same manner as Example 1, except that a chain transfer agent, hydrogen, is continuously fed to the reactor to produce a 1.5 g/10 min MFR polypropylene polymer. Also, as discussed earlier, 820 ppm to 830 ppm of ADK NA-11 nucleator/clarifier is used in the polymer of this Example.

Example 6

An impact modified polypropylene copolymer of Example 6, Tables 1 and 2, is produced in the same manner as Example 4, except that, as discussed earlier, 820 ppm of ADK NA-11 nucleator/clarifier is used in the polymer of this Example. The crystallinity of the intermediate homopolymer was not measured, but the value of crystallinity is expected to be similar to the values for the homopolymer of Example 1, possibly lower by about 1%. However, the values for melting point temperature, crystallization temperature and flexural modulus were measured and were found to be as follows: (1) the melting point will be reduced by no greater than 1° C., (2) the crystallization temperature is unchanged, and (3) the 1% secant flexural modulus is reduced by about 4000 p.s.i. compared to the values provided for the homopolymer of Example 1.

The impact modified polypropylene polymer of Example 6 had the following properties in addition to those listed in Tables 1 and 2:

Notched Izod, 73 def F, ft-lb/in: 10.5 ft-lb/in;

Distortion temperature under load, 66 psi, deg. F.: 240° F. (measured in accordance with ASTM D 648-98c); and Tensile Strength at yield, in accordance with ASTM D 638-99 of 5100 psi.

Example 7a

A copolymer of ethylene and propylene, Example 7a, Tables 1 and 2, is produced in a single, continuous bulk phase (condensed propylene) loop reactor. A Ziegler-Natta catalyst, which includes a titanium catalytic active metal species supported on a magnesium chloride support, which is commercially available as Toho series C, group JC, is suspended in Kaydol white mineral oil, available from Witco, and stored in a stirred catalyst feed tank. The suspended catalyst is pumped directly into a nominal 150 gallon continuous, pumped loop reactor. The desired temperature of the reactor is 70-76° C., controlled with an external cooling jacket on the loop reactor. An external alkoxysilane donor, which is commercially available from Degussa-Huels, $[(CH_2)_4CH]_2Si(OMe)_2$ (and is often referred to as D-Donor) diluted with hexane as appropriate to facilitate flow control, is fed continuously to the reactor in the amount needed to reduce the xylene extractable fraction to less than 1%, measured as described above. The target concentration of the external donor in the liquid propylene, corrected for solids, is 150 ppm. Aluminum alkyl cocatalysts diluted with hexane as appropriate to facilitate flow control, (triethylaluminum, $AlEt_3$ commonly called TEAL) are added to the propylene feed stream to adjust the TEAL concentration in the liquid propylene to a control target of 150 ppm in the liquid propylene.

A random co-polymerization of ethylene and propylene is conducted with the reactor polymer solids ranging from 20-45 wt. %. Ethylene is continuously fed to the reactor with the propylene to achieve a target of 0.5 percent by weight units derived from ethylene. A chain transfer agent, hydrogen, is continuously fed to the reactor, to produce a 3 g/10 min MFR propylene copolymer, as measured by ASTM D 1238-01. The reactor discharge stream is degassed in a vessel to separate the liquid propylene and process lights from the polypropylene powder product. The degassed powder then is continuously forwarded to a Hosokawa Bepex Torus Disc heat exchanger and then to a purge column where counter flow of humidified nitrogen removes residual monomer. Reactor powder is collected in boxes and sent to a separate compounding facility.

A nucleator/clarifier additive or agent Millad 3988 available from Milliken & Company, Antioxidants Irgafos™ 168, Tris(2,4-di-t-butylphenyl) phosphite, and Irganox™ 1010, Tetrakismethylene(3,5-di-t-butyl-4-hydroxyhydrocinnamate) methane, which is commercially available from CIBA Specialty Chemical. DHT-4A is a hydrotalcite-like, $Mg_{4.3}Al_2$ $(OH)_{12.6}CO_3$-$mH_2O$, compound that has been developed as a stabilizer (halogen scavenger) for polyolefin and other plastics. DHT-4A is sold commercially by Kyowa Chemical Industry Co., Ltd. The Millad 3988 at 500 ppm, DHT-4A at 400 ppm, Irgafos 168 at 1000 ppm and Irganox 1010 at 1000 ppm are fed along with the reactor powder to a Century 40 mm twin screw extruder, pelletized and placed into boxes.

Example 7b

A copolymer of ethylene and propylene, Example 7b, Tables 1 and 2, is produced in the same manner as Example 7a, except that ADK NA-11 is compounded into the resin at 2000 ppm using a ZSK 30 mm twin screw extruder.

Example 8

A copolymer of ethylene and propylene, Example 8, Tables 1 and 2, is produced in the same manner as Example 7b, except that ethylene is continuously fed to the reactor to produce a target 1.5 wt. % ethylene co-polymer.

Example 9

A copolymer of ethylene and propylene, Example 9, Tables 1 and 2, is produced in the same manner as Example 7b, except that ethylene is continuously fed to the reactor to produce a target 2 wt. % ethylene co-polymer.

Example 10

A copolymer of ethylene and propylene, Example 9, Tables 1 and 2, is produced in the same manner as Example 7b, except that ethylene is continuously fed to the reactor to produce a target 3 wt. % ethylene co-polymer.

Examples 7a-10 show that the propylene-based copolymers of the invention have an excellent balance of flexural modulus and optics compared to conventional Ziegler-Natta propylene-based copolymers. This is further illustrated by the FIGURE, which shows that the inventive propylene-based copolymers exhibit better modulus than conventional Ziegler-Natta propylene-ethylene copolymers at ethylene levels of 3% by weight or less.

COMPARATIVE EXAMPLE

Comparative Example 1

A commercial homopolymer product of Basell, T2101F, Tables 1 and 2, which has a broad molecular weight distribution.

Comparative Example 2

A commercial product of Amoco, 9433, Tables 1 and 2, which has a broad molecular weight distribution.

Comparative Example 3

A commercial product of Basell, V2400G, Tables 1 and 2, which has a broad molecular weight distribution.

Comparative Example 7

A commercial product available from The Dow Chemical Company under the trade name H308-02Z, Tables 1 and 2, which has been compounded with an additional 2000 ppm of ADK NA 11.

Comparative Example 10a

A commercial product available from The Dow Chemical Company under the trade name 6D69, Tables 1 and 2, which has been compounded with an additional 2000 ppm of ADK NA 11.

Comparative Example 10b

A commercial product available from The Dow Chemical Company under the trade name 6D65L, Tables 1 and 2, which has been compounded with an additional 2000 ppm of ADK NA 11.

*The Flexural Modulus results listed in Tables 1 and 2 for the Resins of Examples 7b-10 and Comparative Examples 7, 10a, and 10b were obtained in accordance with test method ASTM D790-00, except the samples were allowed to age for two weeks prior to testing.

TABLE 1

|  | ASTM Flexural Modulus, 1% Secant, psi | GPC Mw/Mn | GPC Mw | ASTM Melt Flow Rate, g/10 min. @ 230 C./2.16 kg | Xylene Insolubles, wt. % | Nucleating Agent, ppm | ASTM D 1003 Haze % |
|---|---|---|---|---|---|---|---|
| Example 1 | 336,000 | 4.5 | 426,000 | 1.7 | 99.1 | ADK NA 11, 1500 | 21 |
| Example 2 | 349,000 | 5.0 | 322,000 | 4.9 | 98.9 | ADK NA 11, 1500 | 21 |
| Example 3 | 338,000 | 5.3 | 180,000 | 49.7 | 98.1 | ADK NA 11, 1500 | 21 |
| Example 4 | 250,000 |  |  | 2.1 |  | ADK NA 11, 1500 | 23 |
| Example 5 | 330,000 | 4.5 | 426,000 | 1.5 | 99.1 | ADK NA 11, 830 | 21 |
| Example 6 | 246,000 | Not measured | not measured | 2.1 | Not measured | ADK NA 11, 820 | 23 |
| Example 7a | 234,000 |  |  | 3.2 | 99.0 | MILLAD 3988, 500 |  |
| Example 7b | 294,000* | 4.8 | 314,100 | 3.0 | 98.5 | ADK NA 11, 2000 | 18 |
| Example 8 | 263,000* | 4.8 | 311,300 | 3.0 | 98.1 | ADK NA 11, 2000 | 17 |
| Example 9 | 215,000* | 5.3 | 319,900 | 3.0 | 97.3 | ADK NA 11, 2000 | 16 |
| Example 10 | 180,000* | 4.6 | 312,600 | 2.8 | 96.8 | ADK NA 11, 2000 | 15 |
| Comparative Example 1 | 310,000 | 8.2 |  | 3.5 | 97.0 | — | — |
| Comparative Example 2 | 350,000 | 11.8 |  | 13.8 | 98.2 | Sodium Benzoate, 870 | 42 |
| Comparative Example 3 | 350,000 | 19.6 |  | 20.0 | 96.7 | talc 2000 | 49 |
| Comparative Example 7 | 242,000* | 5.7 | 387,700 | 2 | 95.9 | ADK NA 11, 2000 | 13 |
| Comparative Example 10a | 180,000* | 4.6 | 356,600 | 2 | 94.6 | ADK NA 11, 2000 | 13 |
| Comparative Example 10b | 170,000* | 4.5 | 296,600 | 4 | 93.9 | ADK NA 11, 2000 | 15 |

TABLE 2

| Material Description | Ethylene content, weight % | DSC Tg, Deg C. | DSC Crystallization Temp, Deg. C. | DSC Melting Temp., deg. C. | DSC Crystallinity % | Pentad/Tripad Ratio (%) | NMR Triad Isotacticity % | NMR Pentad Isotacticity % |
|---|---|---|---|---|---|---|---|---|
| Example 1 | 0 | −3.80 | 133.8 | 168.4 | 73.6 | 99.84 | 99.09 | 98.94 |
| Example 2 | 0 | −3.90 | 133.3 | 167.7 | 75.5 | 99.17 | 99.03 | 98.21 |
| Example 3 | 0 | −4.60 | 133.5 | 166.0 | 75.4 | 98.49 | 98.24 | 96.76 |
| Example 4 | — | — | — | — | — | — | — | — |
| Example 5 | 0 | Not measured | 134.0 | 168.0 | not measured | 99.84 | 99.09 | 98.94 |

TABLE 2-continued

| Material Description | Ethylene content, weight % | DSC Tg, Deg. C. | DSC Crystallization Temp, Deg. C. | DSC Melting Temp., deg. C. | DSC Crystallinity % | Pentad/Tripad Ratio (%) | NMR Triad Isotacticity % | NMR Pentad Isotacticity % |
|---|---|---|---|---|---|---|---|---|
| Example 6 | | Not measured | Not measured | Not measured | not measured | | not measured | not measured |
| Example 7a | 0.3 | — | — | — | — | 98.87 | 97.6 | 96.5 |
| Example 7b | 0.6 | Not measured | 128.0 | 162.1 | 67 | 98.66 | 97.1 | 95.8 |
| Example 8 | 1.3 | Not measured | 127.1 | 158.9 | 67 | 98.53 | 95.7 | 94.3 |
| Example 9 | 2.0 | Not measured | 121.9 | 152.0 | 57 | 98.6 | 93.1 | 91.8 |
| Example 10 | 3.0 | Not measured | 117.4 | 146.8 | 54 | 99.12 | 90.7 | 89.9 |
| Comparative Example 1 | 0 | −4.98 | 126.0 | 165.2 | 70.3 | 99.22 | 97.98 | 97.22 |
| Comparative Example 2 | 0 | −6.51 | 128.0 | 164.3 | 72.8 | 98.58 | 97.98 | 96.59 |
| Comparative Example 3 | 0 | −4.27 | 127.5 | 163.1 | 71.3 | 98.62 | 96.95 | 95.61 |
| Comparative Example 7 | 0.5 | Not measured | 129.0 | 161.2 | 59 | 97.5 | 92.1 | 89.8 |
| Comparative Example 10a | 3.0 | Not measured | 119.3 | 149.5 | 49 | 96.08 | 91.9 | 88.3 |
| Comparative Example 10b | 3.0 | Not measured | 119.1 | 148.0 | 46 | 95.5 | 89.1 | 85.1 |

Examples 11-17

Copolymers that are the same as the copolymers of Examples 7-10 (except that different nucleator/clarifier additives ADK N21 and Millad 3988 are used) are produced. For the resins of Examples 11-17, Table III below shows the values for Flexural modulus, haze, crystallinity, and melting point. For Table III, the flexural modulus data were determined in accordance with ASTM D790-00, except that the samples are aged for two weeks prior to testing. As can be seen from Table III, NA 21 and Millad 3988 operate similarly to NA 11.

that differing levels of Nucleator/clarifier were added to the base resin polypropylene copolymer (the matrix polymer), as indicated in Table IV. This base polypropylene copolymer is compounded with several different impact modifiers to produce impact modified copolymers as set forth in Table IV, Examples 18-21, below. The impact modified copolymer final product is made by introducing the impact modifiers as indicated in Table IV along with the other named additives are combined as described in the pelletization description of Example 7. The impact modifiers listed are all Affinity polymers having the tradenames designated in Table IV for Examples 18-21 and are available from The Dow Chemical

TABLE III

| Material Description | Wt % E | ASTM Melt Flow Rate, g/10 min @ 230 C./2.16 kg | ASTM Flexural Modulus, 1% Secant, psi | ASTM D1003 Haze % | DSC Crystallization Temp. ° C. | DSC Melting Temp. ° C. | DSC Crystallinity % | Nucleating Agent, ppm |
|---|---|---|---|---|---|---|---|---|
| Example 11 | 0.6 | 3.0 | 284,000 | 25 | 124.8 | 161.4 | 60 | ADK NA-21, 2000 |
| Example 12 | 1.3 | 3.0 | 251,000 | 24 | 122.2 | 158.4 | 60 | ADK NA-21, 2000 |
| Example 13 | 2.0 | 3.0 | 204,000 | 18 | 117.5 | 150.5 | 53 | ADK NA-21, 2000 |
| Example 14 | 3.0 | 2.8 | 169,000 | 15 | 114.2 | 145.6 | 53 | ADK NA-21, 2000 |
| Example 15 | 1.3 | 3.0 | 240,000 | 20 | 124.5 | 158.7 | 60 | Millad 3988, 2000 |
| Example 16 | 2.0 | 3.0 | 208,0.00 | 14 | 120.4 | 151.4 | 64 | Millad 3988, 2000 |
| Example 17 | 3.0 | 2.8 | 171,000 | 11 | 115.9 | 146.0 | 55 | Millad 3988, 2000 |

Examples 18-21

A polypropylene copolymer of Example 7b, Tables 1 and 2, is produced in the same manner as Example 7b, except Company under the listed tradenames. All the Affinity polymers listed are substantially linear ethylene/1-octene copolymers exhibiting narrow molecular weight distributions.

TABLE IV

| Composition | | Units | Example 18 | Example 19 | Example 20 | Example 21 |
|---|---|---|---|---|---|---|
| Ethylene level in propylene-copolymer matrix | | wt % | 0.6 | 0.6 | 0.6 | 0.6 |
| Affinity Type | | | PF 1140 | PF 1140 | PL 1850 | PL 1280 |
| Affinity level | | wt % | 14 | 14 | 14 | 14 |
| Affinity Density | | g/cc | 0.90 | 0.90 | 0.90 | 0.90 |
| Affinity Melt Index | 190C. | g/10 min. | 1.5 | 1.5 | 3.0 | 6.0 |
| Clarifier type | | | ADK NA 21 | Millad 3988 | ADK NA 21 | ADK NA 21 |
| Clarifier level | | ppm | 1500 | 1000 | 1500 | 1500 |

| Properties at 23 C. | Method | Units | | | | |
|---|---|---|---|---|---|---|
| Notched Izod Impact | ASTM D256 A | ft-lb/in | 12.4 | 11.3 | 10.5 | 9.0 |
| Flexural Modulus @ 1% Secant | ASTM D 790-00 | psi | 203,354 | 184,979 | 198,500 | 203,433 |
| Gardner Impact | ASTM 5420 GC | in-lbs | 212 | 214 | 217 | 205 |
| Average Heat Distortion 66 psi | ASTM D 648 | C | 104 | — | — | — |
| Tensile Strength @ Yield | ASTM D 638 | psi | 4661 | 4557 | 4723 | 4712 |
| Haze @ 1 mm | ASTM D1003 | % | 18 | 25 | 17 | 15 |

Examples 18-21 show that the use of a highly crystalline polypropylene copolymer of the invention as starting materials, together with ethylene-alpha olefin impact modifiers, will provide impact modified polypropylene copolymers that exhibit an excellent stiffness/toughness/clarity balance. Preferably, the impact modified copolymers have a 1% secant flexural modulus of at least 170,000 p.s.i., more preferably at least 180,000 p.s.i., further more preferably at least 190,000 p.s.i., and in some instances, at least 200,000 p.s.i. Additionally, the impact modified polypropylene copolymers of the invention preferably exhibit "no break" IZOD levels at room temperature and at 0° C.; and preferably exhibit a ductile to brittle transition temperature (DBTT) of less than 10° C., more preferably less than 0° C., further more preferably less than −5° C., and in some instances less than −10° C., even more preferably less than −20° C. Further, the impact modified polypropylene copolymers preferably exhibit haze levels less than 25%, more preferably less than 20%, further more preferably less than 15%, and in some instances less than 10%.

What is claimed is:

1. A polypropylene homopolymer composition having a $M_w/M_n$ of less than 5, a melt flow rate of less than 5 g/10 min, a 1% secant flexural modulus of greater than 300,000 psi, a pentad isotacticity of at least 98%, a haze of less than 25%, less than 2% by weight xylene solubles, and a crystallinity of at least 75%, wherein the polypropylene resin contains 500 ppm to less than 2500 ppm of a nucleator/clarifier additive.

2. The polypropylene resin of claim 1, wherein the polypropylene resin has an isotactic pentad/triad ratio of greater than 95%.

3. The polypropylene resin of claim 2 wherein the polypropylene has a crystallization temperature of greater than 133° C.

4. A polyolefin composition, comprising:
 (a) A polypropylene homopolymer composition having a $M_w/M_n$ of less than 5, a melt flow rate of less than 5 g/10 min, a 1% secant flexural modulus of greater than 300,000 psi, a pentad isotacticity of at least 98%, less than 2% by weight xylene solubles, and a crystallinity of at least 75%;
 (b) less than 40% by weight of an impact modifier having a density of from 0.885 g/ml to 0.91 g/ml,
 wherein the polypropylene contains from 500 ppm to less than 2500 ppm of a nucleator/clarifier additive and exhibits a value of haze of less than 25%.

5. The polyolefin composition of claim 4, wherein the polypropylene contains from 650 ppm to 1500 ppm of a nucleator/clarifier additive.

6. The polyolefin composition of claim 4, wherein the density of the impact modifier is within 0.01 g/ml of a density of the polypropylene resin.

7. The polyolefin composition of claim 5, wherein the density of the impact modifier is within 0.01 g/ml of a density of the polypropylene resin.

* * * * *